US010077210B2

(12) United States Patent
Turpin, Jr.

(10) Patent No.: US 10,077,210 B2
(45) Date of Patent: Sep. 18, 2018

(54) ENCAPSULATED LIGHTWEIGHT POLYMER AGGREGATES

(71) Applicant: Raymond C. Turpin, Jr., Atlanta, GA (US)

(72) Inventor: Raymond C. Turpin, Jr., Atlanta, GA (US)

( * ) Notice: Subject to any disclaimer, the term of this patent is extended or adjusted under 35 U.S.C. 154(b) by 85 days.

(21) Appl. No.: 15/153,227

(22) Filed: May 12, 2016

(65) Prior Publication Data
US 2016/0332911 A1 Nov. 17, 2016

Related U.S. Application Data

(60) Provisional application No. 62/160,463, filed on May 12, 2015, provisional application No. 62/219,511, filed on Sep. 16, 2015.

(51) Int. Cl.
| | | |
|---|---|---|
| *C04B 16/08* | (2006.01) | |
| *C04B 20/12* | (2006.01) | |
| *C04B 28/02* | (2006.01) | |
| *C04B 20/10* | (2006.01) | |
| *C04B 111/40* | (2006.01) | |

(52) U.S. Cl.
CPC .......... *C04B 20/12* (2013.01); *C04B 20/1003* (2013.01); *C04B 28/02* (2013.01); *C04B 2111/40* (2013.01); *C04B 2201/20* (2013.01); *Y02W 30/94* (2015.05)

(58) Field of Classification Search
None
See application file for complete search history.

(56) References Cited

U.S. PATENT DOCUMENTS

| | | | |
|---|---|---|---|
| 2,703,289 A | | 3/1955 | Willson |
| 3,104,196 A | | 9/1963 | Shannon |
| 3,869,295 A | * | 3/1975 | Bowles ............... C04B 20/1055 264/54 |
| 4,035,192 A | | 7/1977 | Busacca |

(Continued)

FOREIGN PATENT DOCUMENTS

| | | |
|---|---|---|
| JP | H0692700 | 4/1994 |
| KR | 20110094903 | 8/2011 |

OTHER PUBLICATIONS

Sisomphon et al. "Application of encapsulated lightweight aggregate impregnated with sodium monofluorophosphate as a self-healing agent in blast furnace slag mortar" Mar. 31, 2011, *Heron*, 56 (1/2); ISBN: 1574-4078, pp. 13-42.

*Primary Examiner* — Richard A Huhn
(74) *Attorney, Agent, or Firm* — Workman Nydegger (57) ABSTRACT

A lightweight aggregate for use in forming lightweight cementitious mixes and/or concrete is formed by encapsulating a plurality of hydrophobic polymer particles (e.g., expanded polystyrene particles) in an encasement having a first layer of a cementitious material and a second layer of a pozzolan or mineral. The lightweight aggregate can be included as at least part of the aggregate component of a cementitious mix to form a lightweight cementitious mix. The lightweight aggregate and/or lightweight cementitious mix can be used to form lightweight concrete. The encasement of the lightweight aggregate allows the cement of the cementitious mix or concrete composition to bond to the lightweight aggregate, thereby promoting strength and durability of the concrete mixture.

26 Claims, 4 Drawing Sheets

(56) References Cited

U.S. PATENT DOCUMENTS

| | | | |
|---|---|---|---|
| 4,095,995 A | 6/1978 | Ullrich | |
| 4,238,242 A | 12/1980 | Park | |
| 4,710,540 A * | 12/1987 | McAlpin | C04B 16/0625 |
| | | | 524/3 |
| 5,308,396 A * | 5/1994 | Kovacs | C04B 20/1055 |
| | | | 106/677 |
| 6,218,002 B1 * | 4/2001 | Wehtje | B29C 44/3461 |
| | | | 106/724 |
| 8,969,464 B2 | 3/2015 | LeBlanc | |
| 2003/0227814 A1 | 12/2003 | Priesentz et al. | |

* cited by examiner

Untreated                     Treated

ENCAPSULATED LIGHTWEIGHT POLYMER AGGREGATES

CROSS-REFERENCE TO RELATED APPLICATIONS

This application claims the benefit of U.S. Provisional Patent Application No. 62/160,463, filed May 12, 2015, and also U.S. Provisional Patent Application No. 62/219,511, filed Sep. 16, 2015, the disclosures of which are incorporated herein in their entirety.

BACKGROUND

The term "lightweight concrete" means concrete that has an in-place, air-dry density that is less than that of normal concrete. Typically, lightweight concrete is made using a lightweight coarse aggregate, such as expanded clay, slate, or shale, or blast furnace slag having a density less than that of normal stone coarse aggregate. Typically, lightweight concrete is used to increase the strength-to-weight ratio of concrete and reduce the dead load of a concrete structure, freeing up design constraints and allowing an engineer or structural designer to reduce the size of columns and other load bearing elements.

Polymers can also be used as aggregates in lightweight concrete. However, many of the most abundant and least expensive polymers are hydrophobic. The use of a hydrophobic aggregate severely limits the ability of the cement paste to form a strong interfacial bond with the aggregate, thereby reducing the strength and durability of the concrete. In addition, polymers have lower compressive strength than natural coarse aggregates, which further reduces compressive strength of concrete made using polymer aggregates.

Further, the use of lightweight aggregates can be limited by the difference in density between the lightweight aggregate and the density of a cementitious paste or mortar added to the lightweight aggregate. When density differences are high, the lightweight aggregate tends to "float" or separate from the higher density cement mortar or paste.

In addition, polymer aggregates, due to their inherent low density, light weight, and porosity, can be difficult to handle, contain, measure, and dispense through standard concrete operating equipment. In particular, the use of pellets of expanded polystyrene ("EPS") has several disadvantages. EPS balls are typically small (about $1/16$ of an inch) and are very light. They can cling to surfaces by static electricity and are difficult to keep together in a pile because of their very low weight. The slightest spill becomes an ecological nightmare, as the raw material literally moves with the wind and because of its size, is very difficult to contain. The material does not readily decompose and becomes a permanent part of the ecology. The handling and placement of about 5 (solid volume) cubic feet of this material into each cubic yard of concrete poses a formidable handling problem, as this volume only weighs about 10 to 15 pounds and is difficult to measure and dispense through standard bins and scales. Complicating all of the above, a delivery truck drum typically vents its air volume as it is being loaded, blowing the polystyrene out into the environment.

Further, some applications of concrete benefit from a composition which dries relatively quickly. For example, where a poured concrete slab is used as a floor of a building, it is often necessary to allow the concrete to dry before placing a coating on the concrete surface. Such evaporation can take several weeks, months, or even a year or more in extreme cases to be complete. Any attempt to place flooring material over the moisture laden concrete slab can result in problems. For example, the adhesive material used to hold the flooring (e.g., tile, hardwood, carpeting, etc.) in place may not stick or adhere well to the moisture laden concrete. In addition, as the moisture within the slab is released into the surface, it can cause alkali accumulation, mold, mildew, delamination, or other deterioration problems with flooring or other materials placed affixed to the moisture laden concrete.

Lightweight concrete is particularly challenging when fast surface drying is desired. That is because the highly porous internal structure of typical lightweight aggregates can, absorb up to 25% or more by weight of water. This water is additive to the normal water included for ease of handling and hydration of the cementitious binder and can impart an additional amount to the concrete mix equal to 3 to 4 times that which must normally evaporate, thereby increasing the time-to-dry for adhesive or epoxy application. This additional time is beyond the tolerance of many fast-track construction schedules and increases the likelihood of bond failure should the drying time period be truncated.

Further, pressures encountered in concrete placement often approach 1000 psi gage pressure within concrete pump lines, forcing excess water into unfilled pores of typical lightweight aggregates. After the return to normal pressure, some of this water escapes the lightweight aggregate and enters the surrounding concrete mix, which can undesirably increase fluidity and deleteriously raise the water-to-cement ratio in the short term and/or remain in the hardened matrix, further contributing to longer drying times.

Accordingly, there has been a long felt need for improvements in lightweight concrete compositions and methods relating to the manufacture and use of lightweight concrete aggregates in lightweight concrete. Such lightweight aggregates should be light weight, should be easy to handle and control, and should provide suitable bond strength with cement paste found in concrete. Additionally, such compositions should not exacerbate and lengthen concrete drying times.

BRIEF SUMMARY

Disclosed herein are lightweight aggregates, lightweight cementitious mixes, lightweight concrete, and methods of making the foregoing. According to some embodiments, a lightweight aggregate composition comprises a plurality of lightweight particles and a cementitious material coated on the plurality of lightweight particles and encapsulating the particles. In some cases, the lightweight particles can be individually encapsulated by a cementitious coating. In other cases, a plurality of lightweight particles can be agglomerated together and encapsulated by the cementitious coating.

In some embodiments, a lightweight aggregate composition includes: (1) a plurality of lightweight particles; and (2) an encapsulating material forming an encasement around individual lightweight particles and/or agglomerates of lightweight particles, the encasement including a first layer of a cementitious material. In some embodiments, the first layer comprises Portland cement.

In some embodiments, the encasement further comprises a second layer outside of the first layer. The second layer may be formed of a material that is unreactive in the absence of calcium oxide or calcium hydroxide. In some embodiments, the second layer is formed from a pozzolan or other mineral, such as a limestone mineral.

In some embodiments, lightweight encapsulated aggregates further include fibers adhered to and/or embedded in the cementitious encasement. Fibers extending from the surface of the lightweight encapsulated aggregates can act as an anchor that reduces or eliminates the tendency of buoyant lightweight encapsulated aggregates to float or migrate to the surface of a fresh concrete mixture (i.e., when displaced by denser materials in the concrete mixture, such as aggregates (e.g., sand or sand and stone aggregates) and cement paste. Fibers incorporated into the cementitious shell can increase the strength and toughness of the lightweight encapsulated aggregates.

In some embodiments, a method of forming a lightweight aggregate for use in a lightweight cementitious mixture or lightweight concrete composition includes: (1) coating individual and/or agglomerated lightweight particles with a first layer formed of a cementitious material; (2) coating the lightweight particles with a second layer formed of a material that is unreactive in the absence of calcium oxide or calcium hydroxide; and (3) allowing the first layer and the second layer to harden and form an encasement on at least some of the lightweight particles. Fibers are optionally added, such as before, during, or after formation of the encasement.

In some embodiments, a lightweight cementitious mixture includes the mixture products of: (1) a lightweight aggregate including individual and/or agglomerated lightweight particles and an encapsulating material coated on the individual and/or agglomerated lightweight particles to form an encasement around the lightweight particles, the encasement including a first layer of a cementitious material and a second layer formed of a material that is unreactive in the absence of calcium oxide or calcium hydroxide, and optionally further including fibers extending from and/or embedded within the encasement; (2) a cementitious binder; (3) fine aggregate (or fine and coarse aggregates); and (4) water. In some embodiments, lightweight concrete is formed from the lightweight cementitious mixture.

In some embodiments, a method of forming a lightweight cementitious mixture comprises: (1) coating individual and/or agglomerated lightweight particles with a cementitious material; and (2) allowing the cementitious material to harden and form an encasement on the lightweight particles to yield a lightweight aggregate, the lightweight particles optionally including fibers extending from and/or embedded within the encasement; and (3) mixing the lightweight aggregate with cement, aggregate and water. The aggregate may comprise fine aggregate or fine and coarse aggregates.

According to some embodiments, a lightweight concrete composition comprises the reaction products of cement, water, fine aggregate, and a lightweight aggregate which includes lightweight particles, a cementitious material encapsulating individual and/or agglomerated lightweight particles, and optionally fibers extending from and/or embedded within the cementitious material.

In some embodiments, a method of forming a lightweight concrete composition comprises: (1) coating individual and/or agglomerates of lightweight particles with a cementitious material; (2) allowing the cementitious material to harden and form an encasement on the lightweight particles to yield a lightweight aggregate, the lightweight aggregate particles optionally including fibers extending from and/or embedded within the cementitious encasement; (3) mixing the lightweight aggregate with cement, aggregate (fine or fine and coarse), and water to form a cementitious mix; and (4) causing or allowing the cementitious mix to harden.

In some embodiments, a method of forming a lightweight concrete composition comprises: (1) initially coating individual and/or agglomerates of lightweight particles with a non-cementitious material to facilitate handling; (2) coating the initially coated particles with a cementitious material; (3) allowing the cementitious material to harden and form an encasement on the lightweight particles to yield a lightweight aggregate, the lightweight aggregate particles optionally including fibers extending from and/or embedded within the cementitious encasement; (4) mixing the lightweight aggregate with cement, aggregate (fine or fine and coarse), and water to form a cementitious mix; and (5) causing or allowing the cementitious mix to harden.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only illustrated embodiments of the disclosure and are therefore not to be considered limiting of its scope. Embodiments of the disclosure will be described and explained with additional specificity and detail through the use of the accompanying drawings in which.

DETAILED DESCRIPTION

The present disclosure describes novel lightweight aggregates, lightweight cementitious mixes, and lightweight concrete, and methods of forming lightweight aggregates, mixes, and concrete.

In some embodiments, a lightweight aggregate includes a plurality of lightweight polymer particles encapsulated in a cementitious encasement. In some embodiments, the lightweight aggregate further includes fibers extending from and/or embedded within the cementitious encasement.

In some embodiments, a lightweight cementitious mixture includes water, cement, fine aggregate (and optionally a coarse aggregate), and a lightweight aggregate including a plurality of lightweight polymer particles encapsulated in a cementitious encasement.

In some embodiments, a lightweight concrete composition includes a cured cementitious binder and a lightweight aggregate bonded by the cementitious binder, the lightweight aggregate including individual and/or agglomerated lightweight polymer particles encapsulated in a cementitious encasement.

In some embodiments, encapsulation of expanded polystyrene (EPS) beads or particles results in permanent disposal of an ecological pollutant and provides field control of random EPS dispersion. Encapsulation controls the tendency of EPS to separate from a concrete mix due to float. Attachment of fibers to the outer surface of lightweight particles can acts as a drag-chute (sea anchor) to control lighter aggregate float. Including reinforcing fiber in the mix meal (encasement interior) enhances both EPS particle containment and pellet toughness. Manufacture of the particles using standard ready-mix equipment permits formation local to the point of use. Flexibility of material provides an opportunity to offer controlled, variable density. Utilization of hydration heat and recycled material EPS creates a uniquely green lightweight aggregate. A pozzolanic outer coats can enhance pellet strength in situ while at the same time preventing agglomeration of the encapsulated lightweight particles.

The lightweight particles may be EPS or some other synthetic lightweight polymer having like characteristics. The particles may be individually encapsulated and/or agglomerates of particles can be encapsulated. The initial particle coating material may be cementitious or non-cementitious. The initial coating may be simply affixed by chemical or mechanical means to facilitate handling. The initial non-cementitious coating could then be overlaid with a cementitious coating. The outer layer normally comprises a pozzolan or a plurality of pozzolans which can react with the cementitious (lime-containing) inner encapsulating material while offering a non-reactive outer surface to surrounding similar particles. The primary purpose of the non-reactive layer is to prevent agglomeration of the pellets in storage while secondarily bonding and adding strength to the inner cementitious (lime containing) encapsulating material. Relatively inert materials such as limestone dust may be used for the outer layer as well. The purpose then being to bond to the inner coat in some fashion while preventing agglomeration with the other coated particles (or pellets).

In some embodiments, if sufficient cementitious material is added as an initial outer coating, the available casting moisture can be consumed and the remaining dry cementitious material can serve the purpose of both reinforcing the outer shell and separating the like-manufactured pellets. A dry powder coating of cementitious binder is less advantageous than a pozzolan, limestone or inert mineral that if moisture exposure is encountered during storage.

I. Encapsulated Particles

It has been discovered that encapsulating a plurality of lightweight aggregate particles, such as lightweight polymer particles, with a cementitious paste or mortar can provide a desired size, density, strength, absorption rate, and/or evaporation rate and can facilitate capture of the particles in a permanent solid and cementitious encasement, thereby reducing handling and environmental exposure problems associated with the particles. In addition, in some embodiments, the particles may be formed of a hydrophobic material such as a hydrophobic polymer, and the hydrophobic nature of the particles can prevent the particles from holding and incorporating additional water to the concrete mix, thereby reducing the overall water content of the concrete mix and associated drying times.

The cementitious material used to form the encasement can be cast into various forms and sizes with a variety of commercially available equipment. In some embodiments, the encasement is formed using a variable water-to-cement ratio intended to achieve a balance in density and strength between the low density hydrophobic polymer and water. Further, the addition of various salts (organic and/or inorganic) or other admixtures, may be incorporated to alter water vapor movement and/or adjust other properties of the cementitious material forming the encasement. Alkali metal salts, for example, can be used to reduce the internal relative humidity of cement paste and concrete and yield a faster drying concrete.

In some embodiments, the particles can be formed of a hydrophobic polymer. For example, the polymer can be formed from monomers such as an acrylic, amide, ester, ether, vinyl acetal, vinyl chloride, olefin, fluorocarbon, and/or styrene. In some embodiments, the particles are formed from a polymer with an expanded or foam structure to provide additional void space within the lightweight aggregate structure. For example, some embodiments of lightweight aggregate include particles formed from expanded polystyrene ("EPS").

The lightweight particles of the present disclosure can be provided in a variety of sizes and shapes. For example, in some embodiments, the particles may be provided in the form of pellets, balls, or beads. In other embodiments, the particles may be provided as remnants of a panel, board, sheet, packing material, or the like. For example, the particles may include shredded, chopped, or otherwise processed portions of EPS or other polymer materials. In other embodiments, the particles may include "noodle" or "peanut" shaped packing fillers or packing materials (e.g., whole or shredded) formed from EPS or other polymer materials. In some embodiments, the particles have a smooth surface and a spherical shape, both of which minimize the amount of water needed for coating the surface of the particles with the cementitious material.

The lightweight particles of the lightweight aggregates of the present disclosure can range in size from about 0.5 mm to about 2 cm in diameter (e.g., as measured across a longest dimension). In the case of virgin expanded polystyrene particles or beads, the lightweight particles can have a standard size, such as about $1/16$ of an inch in diameter. In the case of recycled EPS, the lightweight particles can be formed by milling to a desired size, such as about $1/32$ of an inch in diameter. In some embodiments, the lightweight particles can have a size ranging from about $1/32$ of an inch to about 1 inch, or from about $1/16$ of an inch to about $1/2$ an inch.

In some embodiments, the lightweight particles of the lightweight aggregate are individually separated. For example, each particle (or a majority of particles) may be individually sheathed in a separate encasement. In other embodiments, one or more lightweight particles may be grouped together in a clump or agglomeration of particles. For example, particles may be agglomerated to form clumps averaging about 3 to about 100 particles per clump, or about 5 to about 75 particles per clump, or about 7 to about 50 particles per clump, or about 10 to about 25 particles per clump. Accordingly, the terms "particles," "pellets," and the like, as used herein, may refer to a plurality of individually separated particles and/or to clumps of particles as described.

In some embodiments, the polymer materials can be obtained from solid waste streams and/or as the result of a refuse collection process. For example, EPS is difficult to recycle and, due to its low density and resistance to biodegradation and photo degradation, is typically unsuitable for placement in a landfill. Used and/or discarded EPS materials can often represent a cost to those wishing to dispose of them, making them a low or even zero-cost source of aggregate material. It is even possible for EPS materials to have a negative cost (i.e., someone might pay to have them taken and disposed of).

In some embodiments, the encasement includes a first layer formed from a cementitious material that is intra-reactive (e.g., a material capable of reacting and binding with itself such as a Portland cement) and a second layer disposed outside the first layer and formed from a material that is not intra-reactive (e.g., a material that does not react or bind with itself under normal processing conditions). For example, the second layer may be formed from a material that is unreactive in the absence of calcium oxide or calcium hydroxide, such as a pozzolan (e.g., fly ash, silica fume, volcanic ash, zeolite, metakaolin, natural pozzolan, pumice, steel slag, etc.) or a mineral (e.g., limestone). The first layer is preferably substantially free of aggregate and/or combustion process residues (e.g., bottom ash materials). The first and/or second layers may comprise a cement binder cured using carbon dioxide, such as exposing the cement paste to finely divided carbon dioxide bubbles (e.g., Carbon Cure™) or a pressurized carbon dioxide atmosphere (e.g., Solidia™).

The second layer may be reactive with respect to the first layer, but unreactive with respect to other second layers. For example, when applied to the particles, the material of the second layer may react with the cementitious surface of the first layers of the particles, but after the second layers have been formed on the particles, the outer surfaces of the particles may be rendered unreactive, as a second layer outer surface of one particle will not react with the second layer outer surface of another particle. For example, after formation of the second layer, the contact between particles may be a pozzolan to pozzolan, pozzolan to mineral, or mineral to mineral contact.

The second layer can beneficially react with the cementitious first layer of the particles. This can provide greater encapsulation of the particles (e.g., by strengthening, enlarging, and/or more completely filling out the encapsulation). At the same time, the second layer can render the particles inert and unreactive with respect to each other, allowing, for example, finer control over sizing, separation, and/or handling of the encapsulated particles.

In addition, though unreactive with respect to each other, the particles coated with a second layer may react with additional cementitious material added to the particles in a subsequent process (e.g., when the particles are mixed with a cementitious material to form a lightweight concrete). For example, encapsulated particles may be mixed with water and a cementitious binder to form a lightweight concrete. In such an embodiment, the outer surfaces of the lightweight aggregate can react with the cementitious binder so as to better incorporate the lightweight aggregate into the lightweight concrete. For example, the reactivity between the lightweight aggregate and the cementitious binder may prevent or minimize the formation of void spaces or water pockets caused by migration of particles during curing.

The cementitious material used to form the encasement (e.g., the first layer) can be cast into various forms and sizes with a variety of commercially available equipment. In some embodiments, the encasement is formed using a low water-to-cement ratio. Further, the addition of various salts (organic and/or inorganic) or other admixtures, may be incorporated to alter water vapor movement and/or adjust other properties (e.g., colligative properties) of the cementitious material forming the encasement.

The cementitious material forming the encasement (e.g., the first layer of the encasement) may be formed from one or more cementitious mixtures or blends including Portland cement, blast furnace cement, fly ash cement, other pozzolans, silica fume cement, lime-containing or limestone powder cement (e.g., slag-lime or pozzolan-lime cements), gypsum cement, blast-furnace slag cement, geopolymer cement (e.g., mixtures of alkali metal silicates and aluminosilicate mineral powders such as fly ash and/or metakaolin), and blended cement, for example. Non-limiting examples of pozzolans (e.g., suitable for use as part of a pozzolan cement in the first encasement layer and/or as the second encasement layer or part thereof) include fly ash, silica fume, micronized silica, volcanic ashes, calcined clay, metakaolin, and steel slag. Various partially cementitious by products such as recycled crushed concrete fines or recycled concrete fines may be advantageously included.

In some embodiments, the encapsulated particles are formed with an encasement that covers the entirety of the lightweight polymer particle. In other embodiments, the encapsulated particles are formed with an encasement that partially covers the lightweight polymer particle. For example, an aggregate may include a plurality of particles having an encasement coverage ranging from about 25% to about 100%, or ranging from about 50% to about 100%, or ranging from about 75% to about 100%, or being substantially 100%. In some embodiments, the encasement is provided so as to cover about 25% or more of the exposed surface area of the particles, or about 50% or more of the exposed surface area of the particles, or about 75% or more of the exposed surface area of the particles, or substantially 100% of the exposed surface area of the particles. The object is to completely encase the EPS. Some occasionally may be slightly exposed.

In some embodiments, the water-to-cementitious binder ratio (i.e., ratio of water to cement plus pozzolan) of the cementitious material used to encapsulate lightweight particles is low relative to a typical water-to-cementitious binder ratio ranging from 0.4 to 0.75 (or greater). For example, the water-to-cementitious binder ratio of the cementitious material can range from about 0.2 to about 0.4, or from about 0.2 to about 0.3, or from about 0.20 to about 0.25, or from about 0.20 to 0.22. In certain cases it may be advantageous to increase the water-to-cementitious binder ratio to 0.41 to 0.75, such as 0.41 to 0.59 or 0.6 to 0.75, in order to reduce the encapsulated particles density and conserve utilization of the lightweight particles (EPS). In other cases, the water-to-cementitious binder ratio can be in a range of. (Water is low density and introduced strength loss on a par with EPS so sometimes it can be advantageous to use more water and reduce EPS, usually for economic reasons.)

In some embodiments, the encapsulated particles can include a fibrous material adjoined to the encapsulated particles. The fibrous material may be formed as a plurality of strings, strands, fibers, cords, hairs, filaments, threads, and/or other string-like materials. For example, the fibrous material may include fibers formed from polypropylene, nylon, other polymers, and/or glass. The fibers of the fibrous material can adhere to the surface of the particles to form a particle anchoring structure. For example, a lightweight aggregate including a plurality of such particles can be added to a cementitious binder as part of the formation of a lightweight concrete. The fibers can act as an anchor to restrain the aggregate particles and inhibit their floating upward due to their low density compared to cement paste and mortar. Fibers can also be incorporated into the cementitious shell surrounding the polymer core to increase the strength and toughness of the encapsulated aggregate particles.

Density differences between the cementitious binder and the lightweight aggregate can result in a tendency for the lightweight aggregate to "float" and to separate from the cementitious binder. In some cases, the lower bound density of a lightweight aggregate is limited by this separation tendency. The separation limit can require the use of a higher density aggregate, even in circumstances where lower density aggregate is available and otherwise desired. Beneficially, the particle anchoring structures resulting from the fibrous material can prevent or minimize the migration of the particles of the lightweight aggregate, allowing use of the lightweight concrete mixture despite the density difference between the lightweight aggregate and the cementitious binder.

For example, a cementitious binder (e.g., a cement mortar) may have a density of about 2.0 $g/cm^3$ to about 2.2 $g/cm^3$, whereas a lightweight aggregate as described herein may have a density of about 0.6 $g/cm^3$ to about 1.8 $g/cm^3$, or of about 0.75 $g/cm^3$ to about 1.2 $g/cm^3$. The anchoring structures of the lightweight aggregate can enable the use of a lightweight aggregate having a density that is lower than the separation limit would otherwise allow. The anchoring structures can function to entrain the cementitious material and can enable the particles to behave as though they had a greater density. The fibrous partially covers material can allow the lightweight aggregate to be mixed with a cementitious binder (e.g., a concrete mortar) where there is a density difference between the lightweight aggregate and the cementitious binder of up to about 0.6 $g/cm^3$, up to about 0.8 $g/cm^3$, up to about 1.0 $g/cm^3$, up to about 1.2 $g/cm^3$, up to about 1.4 $g/cm^3$, up to about 1.6 $g/cm^3$, up to about 1.8 $g/cm^3$, or up to about 2.0 $g/cm^3$.

II. Formation of Encapsulated Particles

The encapsulated particles can be formed in a batch process or a continuous process. For example, in some embodiments, the encapsulated particles are formed in a batch process by contacting a plurality of hydrophobic polymer particles with a cementitious material and mixing to provide coverage of the cementitious material over the surfaces of the particles. The bound particles thus formed can then be spread or otherwise dispersed and the cementitious material allowed to harden. For example, the bound particles can be separated and spread apart before storage or curing of the cementitious lightweight by coating with an inert material, thereby forming a plurality of individual, separated particles, each covered with a cementitious encasement and yet separated from the others as opposed to an agglomeration of bound polymer particles bonded together by the cementitious material.

Alternatively, the encapsulated particles can be formed by contacting a plurality of hydrophobic polymer particles with a cementitious material, mixing to provide coverage of the cementitious material over the surfaces of the particles, and allowing the cementitious material to cure or partially cure without spreading the particles out or without completely separating the particles. The resulting structure can then be chipped, ground, cut, or otherwise broken up to provide a lightweight aggregate of desired size, shape, and/or size distribution.

In some embodiments, the encapsulated particles can be formed by contacting a plurality of lightweight polymer particles (such as EPS particles) with a cementitious material in a pelletizer (e.g., a moving or rotating surface such as a rotating drum or rotating disc). In some embodiments, the cementitious material is a Portland cement that is substantially free of aggregate and/or combustion process residues (e.g., bottom ash materials). Water can then be contacted with the particles and the cementitious material. Preferably, the water is added uniformly (e.g., via spraying) and at a rate that avoids causing agglomeration of the particles. In preferred embodiments, the lightweight polymer particles are provided to the pelletizer as raw particle materials (e.g., without any thickening agents, adhesives, or other coatings). The resulting particles may be coated with a first layer of the cementitious material.

In some embodiments, a degree of agglomeration of particles may be desired. For example, in some applications a desired average particle size may be larger than an average particle size of the initial hydrophobic polymer particles. The degree of agglomeration of particles can be controlled by varying the process time within the pelletizer, the amount of water added to the particles, and/or the operational characteristics of the pelletizer (e.g., rotation speed). In some embodiments, the particles have no or minimal agglomeration. In other embodiments, the particles may agglomerate to form clumps averaging about 3 to about 100 particles per clump, or about 5 to about 75 particles per clump, or about 7 to about 50 particles per clump, or about 10 to about 25 particles per clump.

Upon reaching a desired amount of agglomeration, the particles coated with a first layer may then be coated with an anti-agglomeration powder to form a second layer. As described above, the anti-agglomeration powder may be formed from a material that is not intra-reactive (e.g., a pozzolan or mineral) to prevent agglomeration and/or reactivity between the particles.

After application of an anti-agglomeration powder, the particles may be sufficiently firm to be handled. In some embodiments, the pellets may be moved to a storage area where they may be allowed to reach a final set. The storage area may include the addition of heat to reduce the set time of the particles. Additionally, or alternatively, the storage area may be configured as an adiabatic area preventing or minimizing heat transmission so that exothermic heat generated during curing is maintained within the storage area. Set time can range from about 4 to about 16 hours, or from about 6 to about 14 hours, or from about 8 to about 12 hours. After setting, the particles and/or clumps may be removed from excess anti-agglomeration powder, and the excess anti-agglomeration powder may be recycled. In some embodiments, the particles and/or clumps can remain in the storage area after curing until needed. In some cases, it may be desirable to sort the aggregate particles after production to meet ASTM C330 grading requirements.

In some embodiments, a fibrous material may also be added to the mixture during formation of the lightweight aggregate. The fibrous material may be added with the anti-agglomeration powder after the particles have been coated with a cementitious material. Additionally, or alternatively, the fibrous material may be added to the pelletizer with the cementitious material and lightweight polymer particles prior to coating of the particles with the cementitious material.

As described above, the fibrous material can adhere to the lightweight particles and can provide anchoring structures to the lightweight particles. The lightweight particles may then be mixed with a cementitious binder. Separation based on differences in density between the lightweight particles and the cementitious binder may be prevented by the anchoring function of the fibrous material.

In some embodiments, the fibrous material may be subjected to a pre-treatment prior to being added to the lightweight particles. Pre-treated fibrous materials may have a greater degree of separation (e.g., less clumping/agglomeration of fibers) as opposed to untreated fibrous materials. In some embodiments, the fibrous materials may be mixed with a separation promoting material. For example, in some embodiments, the fibrous material may be mixed with an amount of cement, pozzolan, or mineral, preferably in a powder form. The fibrous material and the separation promoting material may then be added to a rotary drum or other mixing device. Upon mixing, the separation promoting material can impinge between the fibers of the fibrous material to promote separation and dispersion of the fibers. In addition, mixing of the fibrous material with the separation promoting material can provide a film or a dusting of the separation promoting material on the fibers. In a dry state this helps maintain fiber separation prior to use. In some embodiments, such a film or dusting can promote adherence of the fibers to the lightweight particles upon mixing with the lightweight particles. For example, the separation promoting material may be a cement powder, and the cement powder may function to promote the bonding of the fibers to the outer surfaces (e.g., pozzolan or mineral surfaces) of the lightweight particles.

In some embodiments, a method of making encapsulated particles includes placing dry pellet materials (e.g., polymer particles and dry cementitious binder) into a rotating drum (which acts as a mixer and pelletizer), allowing them to mix, and then adding a controlled spray of water or (water and optional chemicals) until a point of incipient fusion is attained as evidenced by a firm cluster of rounded pellets showing little surface EPS or other polymer. Careful administration of the water controls the pellet size. Excess results in undesirably large pellets (e.g., >1 inch in diameter) while too little produces small, poorly formed pellets with inferior EPS entrapment. Upon achieving proper pellet formation, it may be desirable or necessary to introduce additional dry material into the mix. This serves to absorb any excess moisture on the pellet surface, ensuring the pellets have sufficient green strength to be handled and to separate the pellets so they do not subsequently agglomerate. This final dust coat is preferably inert by itself and pozzolanic in nature. It may be added in excess of that needed to dry coat the pellets, as later screening may result in loss of loose material (which can be reclaimed and recycled into the manufacturing system). The pozzolan coat serves not only to separate the pellets but to react with the anticipated concrete media to further reinforce the pellet outer shell strength.

An alternative pellet formation system that offers higher casting speed, more flexibility in material variety, and greater ability to encapsulate quantities of EPS is realized by mixing the ingredients with a high shear mixer, introducing water until pelletization begins, and then conveying the nascent pellet material into a rotating drum device wherein the pellets can quickly achieve final form. The pellets so formed are then coated as above and sized either before or after curing and any excess or poorly sized material is reclaimed. The pellets can be mixed in a high shear concrete mixer similar to that found in a ready-mixed concrete plant. Once mixed, the nascent pellets can be discharged into a standard ready-mix concrete truck mixer used to mix and form the encapsulated lightweight aggregate particles. The pellets will form almost immediately in the mixing drum, allowing for the subsequent addition of the final separation coat. The load can then be conveyed to a proper storage point. The pellets, thus formed, have enough green strength to tolerate discharge and stacking. This system is simple to implement, allowing personnel familiar with standard ready-mix equipment to manufacture the lightweight aggregates. This reduces transportation and handling expenses, since manufacturing sites can be hundreds of miles from the point of final use.

In general, any suitable mixer known in the art of concrete, aggregate formation, or fields outside the concrete industry so long as the mixer(s) can be used to form lightweight aggregates of desirable size and at acceptable yield.

Another surprising feature is that if the green pellets are initially stored in an insulated compartment or with sufficient mass, the heat of hydration will accelerate the curing process to the point that the lightweight aggregate is hard enough to utilize in concrete after about 12 to 16 hours. Internal storage temperatures have been recorded as high as 180° F. The pellets, so formed, evidence strengths usually only attained after extended time, usually 14 to 28 days. This curing system enables the casting and curing to be designed to run on a continuous basis regardless of weather and without supplying expensive external heat.

The addition of reinforcing fibers, such as #150 polypropylene fiber as manufactured by Propex Industries, or BASF #M-100 polypropylene fiber, has been found to be beneficial to promote pellet integrity and utility for several reasons. First, the inclusion of fibers in the pellet mix increases the green strength and aids in containment of EPS or other lightweight polymer particles in the event the pellet is crushed during handling. Addition of fiber to the finish coat results in a pellet system that provides fibers that interact with the plastic concrete matrix. These fibers can act as a type of drag-chute, slowing floatation of light-weight pellets, particularly lighter pellets with a specific gravity in the range of 0.85 to 1.25. The barrier to the use of lighter light-weight aggregate has been lack of flexibility in existing manufacturing systems and the tendency for the lighter material to segregate and float to the fresh concrete mix surface.

Lightweight aggregate made herein can overcome both of these obstacles, enabling the concrete producer to use less lightweight aggregate in achieving concrete unit weight targets and reducing aggregate transportation expense if not locally manufactured.

III. Lightweight Cementitious Mixtures and Concretes

In some embodiments, a lightweight cementitious mixture (i.e., a wet concrete mixture) includes water, cement, and a lightweight aggregate, the lightweight aggregate including a plurality of hydrophobic polymer particles encapsulated in a cementitious encasement. Such cementitious mixtures can also include additional components, such as other aggregates (e.g., sand, gravel, rock, or lightweight coarse aggregates, such as expanded clay, slate, or shale, or blast furnace slag), shrinkage reducing agents (e.g., polypropylene glycol and derivatives), plasticizers (e.g., lignosulfonates or polycarboxylates), air entraining admixtures, crushed concrete fines, and recycled concrete fines, for example.

The cement binder used in the cementitious mixture can include any of the cementitious materials described above in relation to the cementitious materials for particle encapsulation, or mixtures thereof. For example, the cement can include one or more cementitious mixtures or blends including Portland cement, blastfurnace cement, flyash cement, pozzolan cement, silica fume, lime-containing or limestone powder cement (e.g., slag-lime or pozzolan-lime cements), gypsum cement, granulated blast-furnace slag cement, geopolymer cement (e.g., mixtures of alkali metal silicates and aluminosilicate mineral powders such as fly ash and/or metakaolin), and blended cement, for example. Non-limiting examples of pozzolans include fly ash, silica fume, micronized silica, volcanic ashes, calcined clay, metakaolin, materials exhibiting latent cementitious potential such as crushed concrete fines and recycled concrete fines.

Embodiments of a lightweight cementitious mixture including the lightweight aggregate can have a water-to-cementitious binder ratio of about 0.2 to 0.75 depending upon the amount of EPS included. In some embodiments, the compressive strength of a cured concrete formed from the cementitious mixture (e.g., as measured by 2 inch ASTM c-109 cubes), is about 2000 psi to about 7500 psi (e.g., is at least about 2,000 psi, or at least about 2,500 psi, or at least about 3,000 psi, or at least about 4,000 psi, or at least about 5,000 psi, or at least about 7500 psi).

Examples of lightweight concrete include hardened concrete using lightweight aggregates and/or lightweight cementitious mixtures as disclosed herein. In some cases, the lightweight concrete can be fast drying concrete that is able to achieve an internal relative humidity of about 90% or less, preferably 80% or less, within a specified time period (e.g., in about 70 days or less, or 60 days or less, or 50 days or less, or 40 days or less, or 30 days or less).

Lightweight cementitious mixtures and concrete according to the present disclosure can provide a number of benefits. For example, difficulties in handling the unencapsulated EPS or polymers is eliminated, and the cementitious encasement of the lightweight aggregate provides a surface to which the cementitious binder can bond during curing of a cementitious mixture, thereby forming a stronger and more durable concrete that avoids the inherent weaknesses and limitations of concrete formed with non-encapsulated hydrophobic polymer aggregates (such as EPS). In addition, the lightweight aggregate can impart desired lightweight properties to the mixture without absorbing and holding water and increasing water load and drying time of the mixture.

Further, the use of a lightweight aggregate formed from a cementitious material and pozzolan coating can provide additional reactive cementitious materials to concrete mixtures (thereby lowering the water-to-cementitious binder ratio of the cementitious mixture) resulting in potential additional water utilization without contributing to excessive fines that can hamper concrete mixtures having low water-to-cementitious binder ratios. For example, increasing the amount of cement binder in powder can be used to hasten concrete drying but can result in an excessive quantity of cementitious powder in the mixture. The encapsulated lightweight aggregates can contribute additional cementitious binder and lower the water-to-cementitious binder ratio without increasing the amount of powder in the cement paste.

EXAMPLES

Comparative Example 1

This example relates to a fast drying lightweight concrete believed to have the lowest water absorption and fastest drying rate of any concrete available in the marketplace. This concrete was made according to the mix design in Table 1.

TABLE 1

| | |
|---|---|
| Cement (Lehigh CA) | 400 lbs. |
| Ground granulated blast furnace slag (GGBFS) | 400 lbs. |
| Orca sand | 1286 lbs. |
| Stalite (expanded slate lightweight agg) | 828 lbs. |
| Plasticizer (Pozzolith 322N) | 59.6 oz. |
| Sodium nitrite | 40 lbs. |
| Water (total) | 270 lbs. |
| Water to cementitious binder ratio (w/cm) | 0.34 |
| Slump (approx.) | 4¼ in. |
| Weight (per cubic foot) | 120 lbs. |

Figure 1:
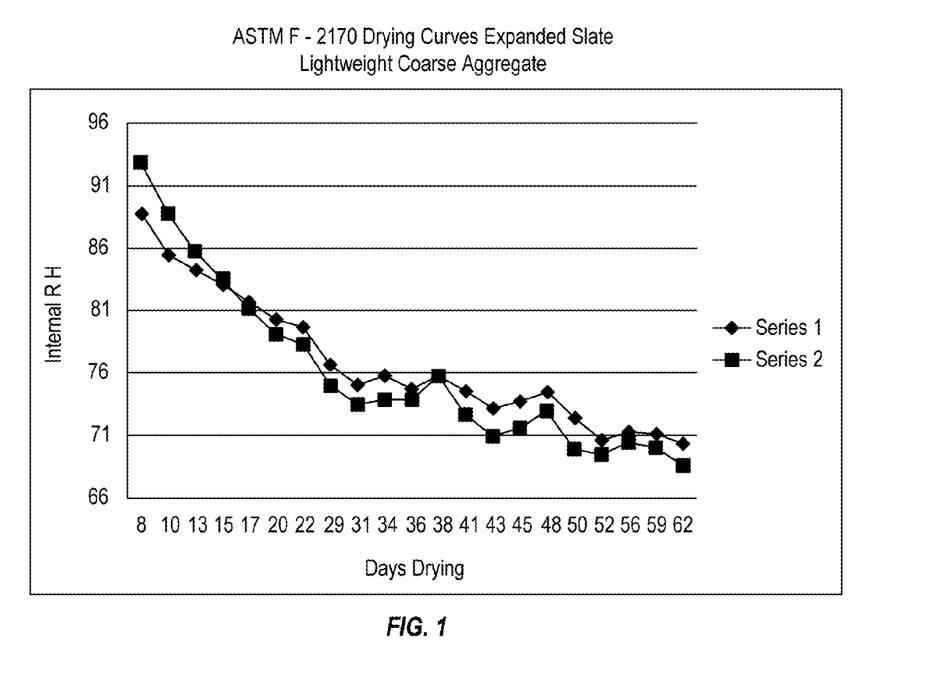
FIG. 1 is a line graph illustrating the internal relative humidity versus time of a fast drying lightweight concrete.

The lightweight concrete composition was cast while in a flowable state into cylinders and the internal relative humidity after hardening was tested at various time intervals according to ASTM F-2170. Two different concrete cylinders were tested (Series 1 and 2). The internal relative humidity (IRH) values are shown in the line graph of FIG. 1. The time required to reach an IRH of 80% was approximately 18 days. The time required to reach an IRH of 70% was approximately 52 days.

Example 2

This example relates to a fast drying lightweight concrete made using a lightweight aggregate as disclosed herein, including a plurality of expanded polystyrene (EPS) particles encapsulated in a cementitious encasement. This concrete was made according to the mix design in Table 2.

TABLE 2

| | |
|---|---|
| Cement (Lehigh CA) | 325 lbs. |
| Ground granulated blast furnace slag (GGBFS) | 325 lbs. |
| Orca sand | 1450 lbs. |
| EPS Pellets (cement encapsulated) | 900 lbs. |
| Sodium nitrite | 40 lbs. |
| Water (total) | 270 lbs. |
| Water to cementitious binder ratio (w/cm) | 0.42 |
| Slump (approx.) | 4 in. |
| Weight (per cubic foot) | 119 lbs. |

Figure 2:
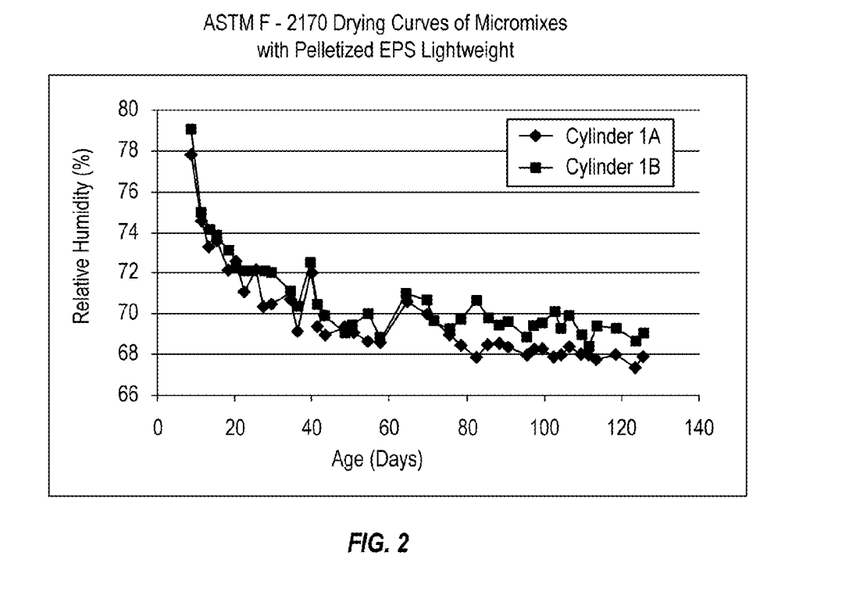
FIG. 2 is a line graph illustrating the internal relative humidity versus time of a lightweight concrete made according to the present disclosure.

The lightweight concrete composition was cast while in a flowable state into cylinders and the internal relative humidity after hardening was tested at various time intervals according to ASTM F-2170. Two different concrete cylinders were tested (1A and 1B). The internal relative humidity (IRH) values are shown in the line graph of FIG. 2. The time required to reach an IRH of 80% was approximately 10 days. The time required to reach an IRH of 70% was approximately 40 days. Even though the concrete made according to Example 2 had a significantly higher w/cm compared to Example 1 (0.42 vs. 0.34), the time required to reach 80% IRH and 70% IRH was shortened by approximately 8 days (10 vs. 18) and 12 days (40 vs. 52), respectively.

Examples 3-6

The cementitious binder compositions made according to Examples 3-6 can be used to encapsulate lightweight polymer particles, such as virgin EPS beads or EPS particles made by milling recycled EPS. As set forth in Table 3, the four cementitious binder compositions are made using various combinations of Portland cement, ground granulated blast furnace slag, natural pozzolan, and lime dust. Units are in pounds.

TABLE 3

| | C ash | Type N | Lime dust | cement/slag |
|---|---|---|---|---|
| | \multicolumn{4}{c}{Example #} | | | |
| | 3 | 4 | 5 | 6 |
| Cement | 0 | 100 | 100 | 200 |
| Slag | 0 | 100 | 100 | 200 |
| Natural pozzolan | 0 | 400 | 0 | 0 |
| Limestone dust | 0 | 0 | 400 | 0 |
| Type C ash | 700 | 0 | 0 | 0 |
| Sand | 1000 | 0 | 0 | 500 |
| Water | 100 | 100 | 125 | 125 |
| Sodium Citrate | 14 | 0 | 0 | 0 |
| Citric Acid | 1 | 0 | 0 | 0 |
| Virgin EPS | 15 | 15 | 0 | 0 |
| Recycled EPS | 0 | 0 | 11 | 20 |
| Specific Gravity | 1.63 | 1.37 | 1.5 | 1.5 |

Examples 7-8

Exemplary lightweight concrete was made using two different concrete mixes as set forth in Table 4. Units are in pounds.

TABLE 4

| | Example # | |
|---|---|---|
| | 7 | 8 |
| Cement | 350 | 350 |
| Slag (GGBFS) | 350 | 350 |
| Sand | 1450 | 1450 |
| Pellet SpG 1.34 | 776 | 0 |
| Pellet SpG 1.59 | 0 | 921 |
| Pozzolith 322N oz | 35.3 | 29 |
| Water | 292 | 292 |
| Unit weight | 119 PCF | 126 |

The compressive strengths of 4×8 inch cylinders of hardened concrete made from the concrete mixes according to Examples 7 and 8 were tested using standard methods. The compressive strengths for each hardened concrete at each of 3, 7, and 28 days is set forth in Table 5.

TABLE 5

| | Example # | |
|---|---|---|
| | 7 | 8 |
| 3 Day, 4 × 8 cylinders | 2560 psi | 3110 psi |
| 7 Day, 4 × 8 cylinders | 3460 psi | 4530 psi |
| 28 Day, 4 × 8 cylinders | 4500 psi | 5760 psi |

Example 9

A lightweight aggregate is formed using a blend of Portland cement, granulated blast furnace slag (GGBFS), finely divided calcareous limestone (minus #100 mesh), water, and a commercially available plasticizing agent to form the cementitious material. The cementitious material is combined with EPS beads to form the encapsulated particles of the lightweight aggregate. The components of the lightweight aggregate are shown in Table 6.

TABLE 6

| Cement | 300 pounds |
|---|---|
| GGBFS | 300 pounds |
| Limestone | 200 pounds |
| Water | 175 pounds |
| Plasticizer | 5 ounces/100 Weight |
| EPS beads | 14.2 pounds |

The water-to-cementitious binder ratio (w/cm) of the cementitious material used to coat the EPS beads is 0.22. The resulting batch of aggregate has a volume of 12.5 cubic feet and a density of 80 pounds per cubic foot, resulting in a specific gravity of 1.28. Following a period of time to permit curing of the encasement, a substitution of this lightweight aggregate for the usual stone aggregate volume of about 10.5 cubic feet per yard results in a weight reduction of about 920 pounds per cubic yard.

Example 10

A lightweight aggregate was formed using a cementitious material of Portland cement and water with a water-to-cement (w/c) ratio of 0.22 to encapsulate a plurality of EPS beads. Components and properties of the lightweight aggregate are shown in Table 7.

TABLE 7

| | Portland Cement | EPS beads | Water | Air | Total |
|---|---|---|---|---|---|
| Weight | 400 g | 10 g | 88 g | | 498 g |
| Solid Volume | 127 cc | 238 cc | 88 cc | 10 cc | 508 cc |

The specific gravity of the resulting lightweight aggregate was 0.98. The lightweight aggregate was subjected to water absorption tests by (1) soaking a portion of it in water for 24 hours, and (2) boiling a portion of it for 24 hours to prime the aggregate with water, then allowing the portions to dry to a stable condition and measuring the moisture loss as measured by differences in weight. The same aggregate was then heated to 300° F. to destroy the polymer particles within the cementitious encasements, leaving hollow encasements, each having a void in the space previously occupied by the EPS particle. The heat-treated encasements were then subjected to the same water absorption test as the non-heated lightweight aggregate.

The changes in weight are indicated in Table 8. The results demonstrate the value of the lightweight EPS aggregate in contributing to weight control while minimizing water absorption as compared to heat-treated encasements where water has entered the void space previously occupied by the polymer particles.

TABLE 8

| | 24 hour soak | 24 hour boil |
|---|---|---|
| Low weight aggregate | 16.1% | 18.8% |
| Heat-treated encasements | 15% | 52% |

A further evaluation of potential water absorption under extreme pump pressure was conducted by placing samples of the lightweight aggregate in this Example into a scuba tank. The samples were then submerged in a water solution containing a red dye. Air pressure was applied to the tank to the level of 1000 psi gage pressure and maintained for 15 minutes. Subsequently, the samples were removed and broken open. The red dye had penetrated approximately 1/16th of an inch into a ¾ inch average sized spherical particle, indicating relatively little penetration.

Examples 11-16

A variety of lightweight aggregates ("LWA") were formed using the components and having the properties shown in Table 9.

TABLE 9

| Example | Portland Cement (lbs.) | GGBFS (lbs.) | Limestone Dust (lbs.) | Water (lbs.) | Water to cement ratio | EPS beads (lbs.) | Specific Gravity (lbs.) |
|---|---|---|---|---|---|---|---|
| 11 | 400 | 400 | 0 | 224 | 0.28 | 12.5 | 1.35 |
| 12 | 400 | 400 | 0 | 205 | 0.26 | 12.5 | 1.34 |
| 13 | 233 | 233 | 233 | 209 | 0.26 | 12.5 | 1.32 |
| 14 | 233 | 233 | 233 | 200 | 0.25 | 12.5 | 1.31 |
| 15 | 800 | 0 | 0 | 186 | 0.23 | 12.5 | 1.37 |
| 16 | 800 | 0 | 0 | 182 | 0.22 | 12.5 | 1.39 |

Examples 17-24

A number of concrete mixtures were formed using the components and having the properties shown in Table 10. The concrete mixtures were prepared with a water-to-cementitious binder ratio of 0.35. Examples 17-18 included no lightweight aggregate, while Examples 19-24 included the lightweight aggregates made according to Examples 11-16, respectively.

TABLE 10

| Example | Portland Cement I-II (lbs.) | GGBFS (lbs.) | Concrete Sand (lbs.) | Water (lbs.) | LWA Example # | LWA (lbs.) | #67 Granite (lbs.) | Plasticizer (cc) | Yield (Cubic Feet) | Density per cubic foot |
|---|---|---|---|---|---|---|---|---|---|---|
| 17 | 400 | 400 | 1300 | 280 | n/a | 0 | 1670 | 1 | 27.5 | 148.0 |
| 18 | 400 | 400 | 1300 | 280 | n/a | 0 | 1670 | 1 | 27.5 | 148.0 |
| 19 | 400 | 400 | 1300 | 295 | 11 | 841 | 0 | 1 | 28.1 | 114.6 |
| 20 | 400 | 400 | 1300 | 280 | 12 | 834 | 0 | 1 | 27.8 | 115.6 |
| 21 | 400 | 400 | 1300 | 280 | 13 | 822 | 0 | 1 | 27.8 | 115.0 |
| 22 | 400 | 400 | 1300 | 280 | 14 | 816 | 0 | 1 | 28.0 | 114.1 |
| 23 | 400 | 400 | 1300 | 280 | 15 | 854 | 0 | 1 | 27.9 | 116.0 |
| 24 | 400 | 400 | 1300 | 280 | 16 | 866 | 0 | 1 | 27.8 | 116.8 |

Figure 3:
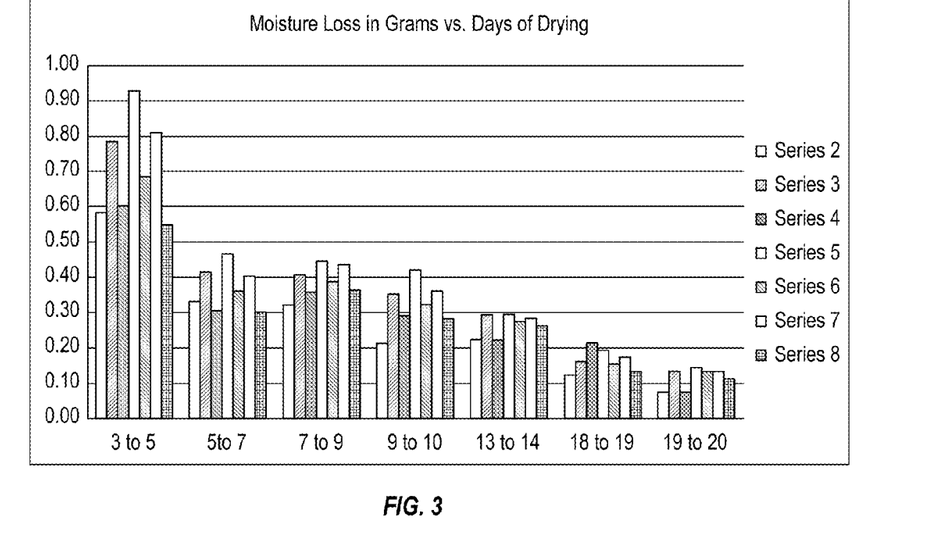
FIG. 3 is a bar graph illustrating the moisture loss over time of a variety of concrete mixtures of the present disclosure.

The moisture loss over time of the concrete mixtures of Examples 18-24 was investigated by placing the wet mixtures in plastic trays measuring 6×6 inches and about 1.5 inches deep. These were then sealed for 24 hours under plastic-wrap. The seal was then removed and the trays weighed to the nearest 0.01 gram. The trays were reweighed every few days until they reached a 24 hour loss of 0.1 grams. The results are indicated in FIG. 3. Examples 18-24 are designated as Series 2-8, respectively, in FIG. 3.

Figure 4:
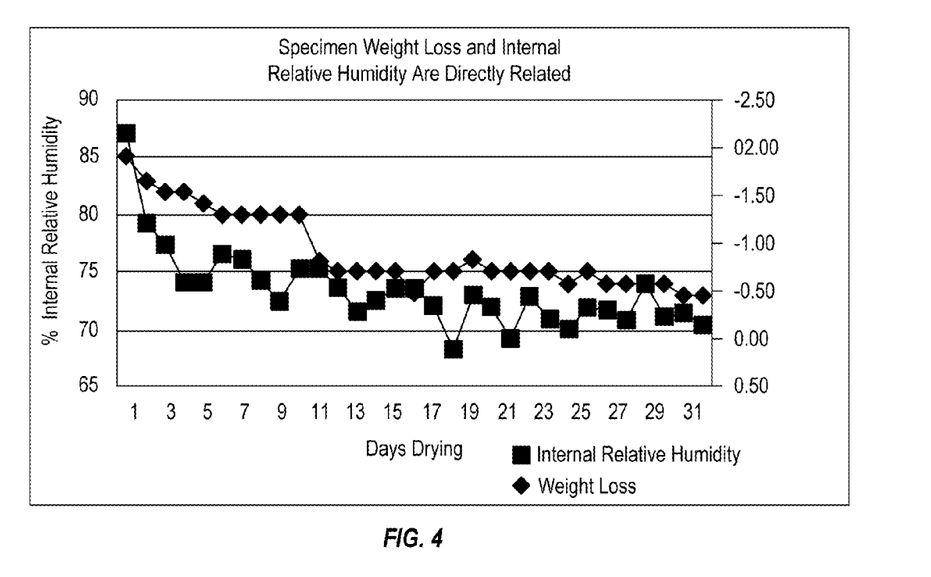
FIG. 4 is a line graph illustrating the relationship between specimen weight loss and internal relative humidity.

The graph in FIG. 4 shows weight loss as a function of time of a lightweight fast drying concrete due to water evaporation and also internal relative humidity as a function of time. As shown in FIG. 4, the specimen weight loss and internal relative humidity are directly related. For example, as the weight loss approaches 0.00, the internal relative humidity drops below 75, which indicates a "dry surface according to ASTM F-2170.

Examples 25 and 26

Concrete mixtures were formed using the components and having the properties shown in Table 11. The lightweight aggregate in Examples 25 and 26 included a polypropylene fibrous material applied in an amount to sufficiently coat and adhere to the EPS particles of the lightweight aggregate. The compressive strengths for each example various days is also set forth in Table 11.

TABLE 11

| | Example | |
|---|---|---|
| Components/Attributes | 25 | 26 |
| Density | 120 lbs./ft$^3$ | 100 lbs./ft$^3$ |
| Cements | 700 lbs. | 700 lbs. |
| Sand | 1400 lbs. | 1400 lbs. |
| Lightweight aggregate | 250 lbs. | 400 lbs. |
| Local small stone | 550 lbs. | None |
| Water | 343 lbs. | 336 lbs. |
| Water Reducer | As required | As required |
| PCF, wet | 122.2 | 102.1 |
| 8 Day cube | 4730 psi | 3550 psi |
| 8 Day 4 × 8 cyl | 3280 psi | 2790 psi |
| 28 Day cube (2) | 4820 psi | 3870 psi |
| 28 Day 4 × 8 cyl (2) | 4000 psi | 3290 psi |
| 28 day cylinder/cube | 83% | 85% |

Example 27

Figure 5:
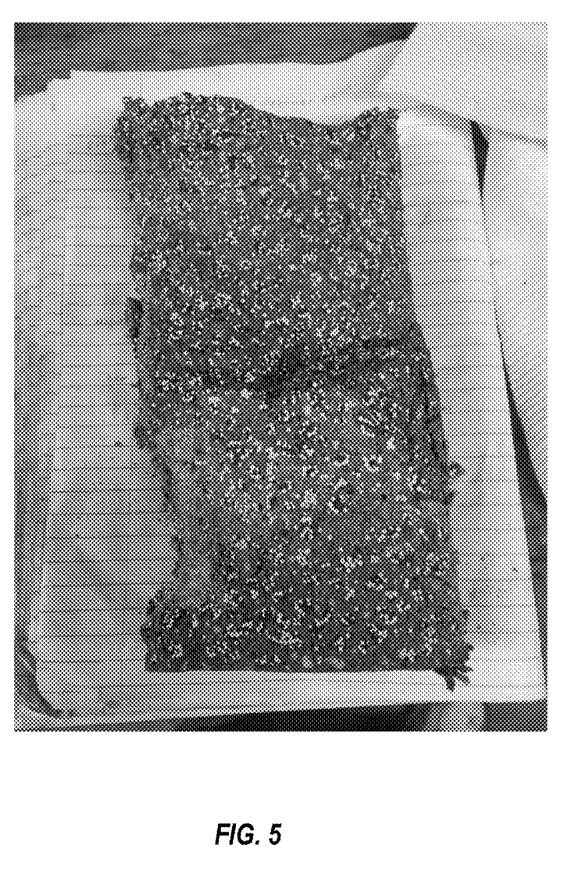
FIG. 5 is a photograph of a concrete cylinder formed using a lightweight aggregate having a fibrous material.

A concrete mixture including a lightweight aggregate having a fibrous material as in Examples 25 and 26 was cast in a 4×8 inch cylinder. The resulting cast is shown in FIG. 5. As shown, the lightweight aggregate is distributed evenly throughout the cylinder.

Example 28

Figure 6:
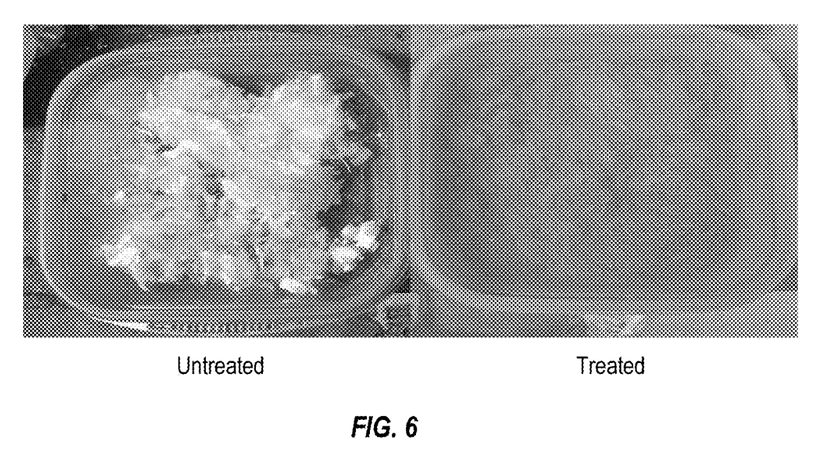
FIG. 6 is a photograph of polymer fibers before and after a separation pretreatment.
Figure 7:
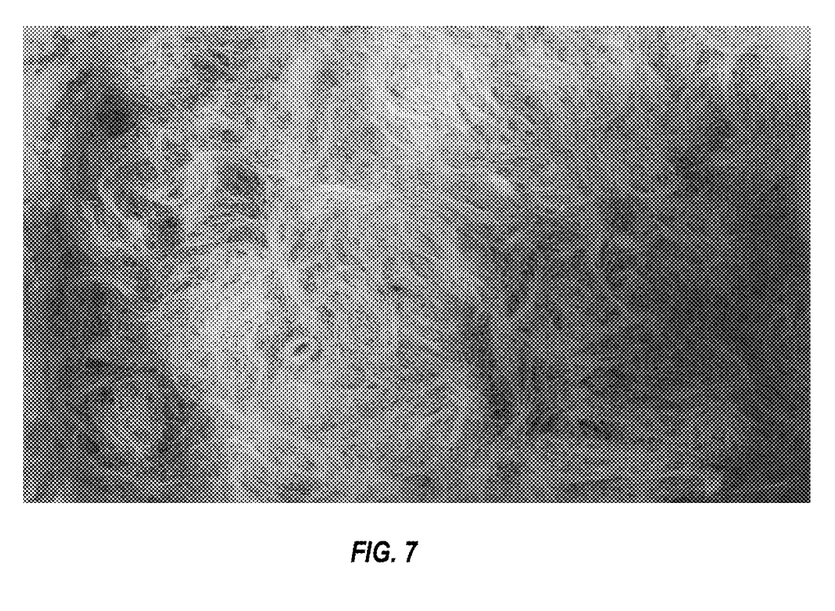
FIG. 7 is a photograph of polymer fibers subjected to a separation pretreatment.

Polypropylene fibers were subjected to a pre-treatment by mixing an amount of the polypropylene fiber in a rotary drum with an amount of cement powder. FIG. 6 shows a comparative view of the polypropylene fibers prior to the pre-treatment and after the pre-treatment. As shown, the pre-treatment can cause the fibers to separate and disperse as they become dusted with the added cement powder. FIG. 7 shows a close-up view of the pre-treated fibers, illustrating that the fibers have been disentangled, enabling a more dispersed and more effective application of the fibers to lightweight particles.

Examples 29-30

Lightweight aggregate compositions for use in making lightweight concrete were made using the components set forth in Table 12 and had the physical attributes also set forth in Table 12.

TABLE 12

| Components/Attributes | Example 29 | Example 30 |
|---|---|---|
| Portland Cement | 100 lbs. | 100 lbs. |
| Blast Furnace Slag | 100 lbs. | 100 lbs. |
| Class F Fly Ash | 300 lbs. | 200 lbs. |
| EPS | 7.74 lbs. | 16.13 lbs. |
| Water | 90 lbs. | 75 lbs. |
| Polymer Fibers | 2 lbs. | 2 lbs. |
| Specific Gravity | 1.25 | 0.85 |

First, a dry pre-mix was made by combining the Portland cement, blast furnace slag, expanded polystyrene (EPS) beads, and polymer fibers in a rotating drum mixer. Thereafter, water was introduced into the rotating drum mixer using in a controlled manner using a fine spray until pelletized aggregates were formed having a size up to 1 inch in diameter and having a first cementitious coating encapsulating and adhering smaller EPS beads together to form lightweight aggregates of desired size. Thereafter, the fly ash was introduced into the rotating drum mixer to provide a dry outer coating to the pelletized aggregates, which increased their green strength and prevented the pelletized aggregates from sticking to each other. The green pelletized aggregates were then introduced into an insulated container to cure. Heat from the cementitious binder materials raised the temperature and accelerated curing of the pelletized aggregates inside the container. Upon curing after 24-48 hours, the pelletized aggregates had sufficient strength to avoid being crushed. A portion of the polymer fibers was embedded within and strengthened the cementitious shells of the lightweight aggregate particles. A portion of the polymer fibers extended outwardly from the cementitious shells and provided an anchoring effect that inhibit the tendency of the lightweight aggregates to float in freshly mixed concrete.

The terms "approximately," "about," and "substantially," as used herein, represent an amount or condition close to the stated amount or condition that still performs a desired function or achieves a desired result. For example, the terms "approximately," "about," and "substantially" may refer to an amount that is within less than 10% of, within less than 1% of, within less than 0.1% of, and within less than 0.01% of a stated amount or condition. In addition, unless expressly described otherwise, all amounts (e.g., dimensions, unit measurements, weight, volume, etc.) are to be interpreted as being "approximately," "about," and/or "substantially" the stated amount, regardless of whether the terms "approximately," "about," and/or "substantially."

Additionally, elements described in relation to any embodiment depicted and/or described herein may be combinable with elements described in relation to any other embodiment depicted and/or described herein. For example, any element described in relation to an embodiment of a lightweight aggregate may be combinable with any embodiment described in relation to a lightweight concrete mixture.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A lightweight aggregate composition, comprising:
a plurality of pellets, each comprising:
a clump or agglomeration of about 3 to about 100 polymer particles, the polymer particles having a size in a range of about 0.5 mm to about 2 cm; and
an encapsulating material forming a coating on the pellet and adhering together the polymer particles, the encapsulating material forming an encasement around at least some of the pellets, the encasement including a first layer of a hardened cementitious material,
the lightweight aggregate composition having a density in a range of about 0.6 g/cm$^3$ to about 1.8 g/cm$^3$.

2. The lightweight aggregate composition of claim 1, wherein the first layer comprises hardened Portland cement.

3. The lightweight aggregate composition of claim 1, wherein the encasement further comprises a second layer outside of the first layer, wherein the second layer is formed of a pozzolan or mineral that prevents agglomeration of the pellets.

4. The lightweight aggregate composition of claim 3, wherein the second layer is formed from a material selected from the group consisting of fly ash, silica fume, micronized silica, volcanic ashes, zeolites, calcined clay, metakaolin, natural pozzoloan, pumice, steel slag, and limestone.

5. The lightweight aggregate composition of claim 3, wherein the second layer is reactive with the first layer.

6. The lightweight aggregate composition of claim 1, further comprising a fibrous material adhered to a surface of the encasement around at least some of the pellets.

7. The lightweight aggregate composition of claim 6, wherein the fibrous material forms an anchoring structure on one or more of the pellets, the anchoring structure being configured to reduce the migration of the one or more pellets when the pellets are mixed with a cementitious binder having a greater density than a density of the pellets.

8. The lightweight aggregate composition of claim 6, wherein the fibrous material is formed from a polymer or glass.

9. The lightweight aggregate composition of claim 1, wherein the polymer particles comprise a hydrophobic polymer.

10. The lightweight aggregate composition of claim 9, wherein the polymer particles comprise expanded polystyrene.

11. The lightweight aggregate composition of claim 9, wherein the polymer particles have an expanded or foam structure providing void space within the polymer particles.

12. The lightweight aggregate composition of claim 1, wherein the pellets comprise peanut-shaped packing fillers.

13. The lightweight aggregate composition of claim 1, wherein the polymer particles each have a size within a range of about 1/16 inch to about 1/2 inch.

14. The lightweight aggregate composition of claim 1, wherein the cementitious material is selected from the group consisting of Portland cement, blastfurnace cement, fly ash cement, pozzolan cement, silica fume cement, mortar, lime-containing cement, gypsum cement, granulated blast-furnace slag cement, carbon cured cement, and geopolymer cement.

15. The lightweight aggregate composition of claim 1, wherein the cementitious material has a water-to-cementitious material ratio ranging from about 0.2 to about 0.75.

16. A cementitious mixture comprising mixture products of:
a lightweight aggregate composition according to claim 1;
a cementitious binder; and
water.

17. The cementitious mixture of claim 16, further comprising an additional aggregate selected from the group consisting of sand, gravel, rock, coarse aggregate, expanded clay, expanded slate, expanded shale, and expanded blast furnace slag.

18. The cementitious mixture of claim 16, further comprising an admixture.

19. A solid concrete formed from the cementitious mixture of claim 16.

20. A lightweight aggregate composition, comprising:
a plurality of pellets, comprising:
clumps of about 3 to about 100 expanded polystyrene particles per clump, and
an encapsulating material coated on the plurality of pellets and adhering together the expanded polystyrene particles, the encapsulating material forming an encasement around at least some of the pellets, the encasement including a first layer of a hardened cementitious binder,
the lightweight aggregate composition having a density in a range of about 0.6 $g/cm^3$ to about 1.8 $g/cm^3$.

21. The lightweight aggregate composition of claim 20, wherein the cementitious binder is selected from the group consisting of Portland cement, blastfurnace cement, fly ash cement, pozzolan cement, silica fume cement, mortar, lime-containing cement, gypsum cement, granulated blast-furnace slag cement, carbon cured cement, and geopolymer cement.

22. The lightweight aggregate composition of claim 20, wherein the encasement further comprises a second layer outside of the first layer, wherein the second layer comprises a material selected from the group consisting of fly ash, silica fume, micronized silica, volcanic ashes, zeolites, calcined clay, metakaolin, natural pozzoloan, pumice, steel slag, and limestone.

23. The lightweight aggregate composition of claim 20, further comprising a fibrous material adhered to a surface of at least some of the pellets.

24. The lightweight aggregate composition of claim 20, the pellets comprising about 7 to about 50 expanded polystyrene particles per clump.

25. A lightweight aggregate composition, comprising:
a plurality of pellets, comprising:
clumps of about 5 to about 75 expanded polystyrene particles per clump, the polystyrene particles having a size in a range of about 0.5 mm to about 2 cm; and
an encapsulating material coated on each of the plurality of pellets and adhering together the expanded polystyrene particles, the encapsulating material forming an encasement around at least some of the pellets, the encasement including a first layer of a hardened cementitious binder comprising Portland cement and a second layer outside of the first layer, wherein the second layer is formed of a pozzolan or mineral that prevents agglomeration of the pellets,
the lightweight aggregate composition having a density in a range of about 0.75 $g/cm^3$ to about 1.2 $g/cm^3$.

26. The lightweight aggregate composition of claim 25, further comprising a fibrous material adhered to a surface of at least some of the pellets.

* * * * *